United States Patent [19]

Mori et al.

[11] Patent Number: 4,774,011

[45] Date of Patent: Sep. 27, 1988

[54] ELECTROLYTE FOR ALUMINUM ELECTROLYTIC CAPACITOR

[75] Inventors: Shoichiro Mori; Makoto Ue; Kazuhiko Ida, all of Ibaraki, Japan

[73] Assignee: Mitsubishi Petrochemical Co., Ltd., Tokyo, Japan

[21] Appl. No.: 50,574

[22] Filed: May 18, 1987

[30] Foreign Application Priority Data

| Date | Country | Number |
|---|---|---|
| May 20, 1986 | [JP] Japan | 61-115616 |
| May 20, 1986 | [JP] Japan | 61-115618 |
| May 20, 1986 | [JP] Japan | 61-115619 |
| Jun. 20, 1986 | [JP] Japan | 61-144581 |
| Jun. 20, 1986 | [JP] Japan | 61-144583 |
| Jun. 20, 1986 | [JP] Japan | 61-144585 |
| Jun. 20, 1986 | [JP] Japan | 61-144587 |
| Jun. 25, 1986 | [JP] Japan | 61-148697 |
| Jun. 25, 1986 | [JP] Japan | 61-148698 |
| Jul. 4, 1986 | [JP] Japan | 61-157327 |
| Jul. 7, 1986 | [JP] Japan | 61-158962 |
| Jul. 7, 1986 | [JP] Japan | 61-158963 |
| Jul. 14, 1986 | [JP] Japan | 61-165160 |
| Sep. 5, 1986 | [JP] Japan | 61-208886 |

[51] Int. Cl.$^4$ ............................................. H01G 9/02
[52] U.S. Cl. ...................................... 252/62.2; 361/433
[58] Field of Search ......................... 252/62.2; 361/433

[56] References Cited

U.S. PATENT DOCUMENTS

| | | | |
|---|---|---|---|
| 3,223,639 | 12/1965 | Powers et al. | 252/62.2 |
| 3,325,697 | 6/1967 | Ross | 252/62.2 |
| 3,547,423 | 12/1970 | Jenny et al. | 252/62.2 |
| 4,031,436 | 6/1977 | Alwitt | 252/62.2 |

FOREIGN PATENT DOCUMENTS

| | | | |
|---|---|---|---|
| 54-9704 | 4/1979 | Japan | 252/62.2 |
| 933937 | 8/1963 | United Kingdom | 252/62.2 |

*Primary Examiner*—Jack Cooper
*Attorney, Agent, or Firm*—Oblon, Fisher, Spivak, McClelland & Maier

[57] ABSTRACT

An electrolyte for use in an aluminum electrolytic capacitor is described. The electrolyte comprises a solution of a quaternary phosphonium salt as a solute dissolved in an aprotic solvent. The electrolyte can reduce internal resistance of the electrolytic capacitor and broaden the temperature range over which the electrolytic capacitor can be used.

3 Claims, 1 Drawing Sheet

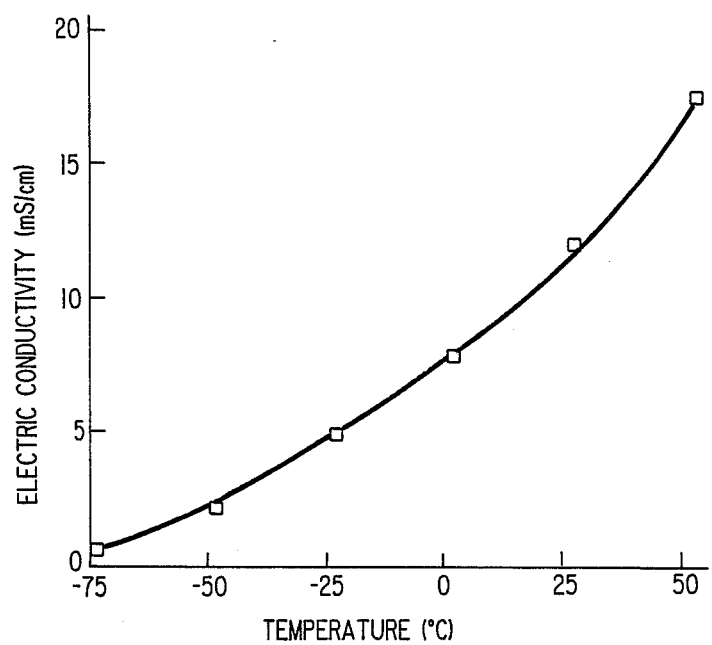

ELECTROLYTE FOR ALUMINUM ELECTROLYTIC CAPACITOR

FIELD OF THE INVENTION

The present invention relates to an electrolyte for an aluminum electrolytic capacitor, and more particularly to an electrolyte, which can reduce internal resistance of an electrolytic capacitor and broaden the temperature range over which the capacitor can be used, through the use of an electrolyte containing quaternary phosphonium salts as solute dissolved in aprotic solvents.

BACKGROUND OF THE INVENTION

Conventional electrolytes for aluminum electrolytic capacitors generally comprise some type of ionizable compound dissolved in a solvent.

The chemical or electric properties of the electrolyte, such as electric conductivity and scintillation voltage become main factors for determining the electric properties of the electrolytic capacitors.

For example, a solution of boric acid or ammonium borate in ethylene glycol, which has low electric conductivity and high scintillation voltage, has been used for aluminum electrolytic capacitors operating of 200 V or higher (U.S. Pat. No. 1,891,207). The maximum operating temperature for such an electrolyte system is less than 100° C. and normally 85° C. because a large amount of water formed during the rapid esterification of glycol and borate species at higher temperature deteriorates the electric properties of the electrolytic capacitors. The minimum operating temperature in such a system is above −20° C. since glycol freezes at −17° C.

On the other hand, a solution of an amine or an quaternary ammonium salt of carboxylic acid in an aprotic solvent such as N,N-dimethylformamide or $\gamma$-butyrolactone is used for low voltage electrolytic capacitors, which have a good low temperature characteristics (U.S. Pat. Nos. 3,812,039 and 4,473,864).

However, electrolytes which have higher electric conductivity over the wider temperature range are desirable for imparting lower equivalent series resistance (ESR) and lower impedance at high frequencies to the electrolytic capacitor containing them.

SUMMARY OF THE INVENTION

As the result of various investigations on discovering electrolyte systems having higher electric conductivity, the inventors have discovered that an electrolyte containing a quaternary phosphonium salt dissolved in an aprotic solvent shows higher electric conductivity than those of conventional electrolyte systems and have succeeded in accomplishing this invention.

As to electrolytes using quaternary phosphonium salts, U.S. Pat. No. 3,325,697 refers to quaternary phosphonium salts as one of cations having a reducible group such as nitro groups, etc. which are used for sealed capacitors with non-gas producing electrolyte but there are neither practical illustrations nor examples about this case in the aforesaid patent. Also, we have not yet found any other patents using quaternary phosphonium salts for such electrolyte systems.

Thus, it is a feature of this invention to provide an aluminum electrolytic capacitor utilizing an electrolyte containing a quaternary phosphonium salt as solute dissolved in an aprotic solvent. This electrolyte can reduce the internal resistance of the electrolytic capacitor and broaden the temperature range over which the electrolytic capacitor can be used.

BRIEF DESCRIPTION OF THE DRAWING

The drawing is a graph showing the relation between the electric conductivity of the electrolyte obtained in Example 1 and temperature.

DETAILED DESCRIPTION OF THE INVENTION

The electrolyte for use in this invention is a solution of a quaternary phosphonium salt as solute dissolved in aprotic solvent.

The cation component of the solute for use in this invention is a quaternary phosphonium ion represented by the following general formula (I):

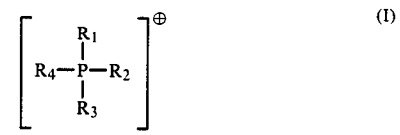

wherein, $R_1$, $R_2$, $R_3$, and $R_4$ each represents hydrocarbon group having from 1 to 20 carbon atoms, and preferably an alkyl group having from 1 to 10 carbon atoms or an aryl group, said adjoining alkyl groups may combine with each other to form a ring.

Specific examples of the alkyl group or aromatic group for $R_1$, $R_2$, $R_3$, and $R_4$ in the general formula (I) described above are a methyl group, an ethyl group, a propyl group, a butyl group, a phenyl group, a benzyl group, etc.

Also, specific examples of the quaternary phosphonium ion shown by the general formula (I) described above are tetramethylphosphonium, tetraethylphosphonium, tetrapropylphosphonium, tetrabutylphosphonium, methyltriethylphosphonium, methyltripropylphosphonium, methyltributylphosphonium, dimethyldiethylphosphonium, dimethyldipropylphosphonium, dimethyldibutylphosphonium, trimethylethylphosphonium, trimethylpropylphosphonium, trimethylbutylphosphonium, ethyltripropylphosphonium, ethyltributylphosphonium, diethyldipropylphosphonium, diethyldibutylphosphonium, triethylpropylphosphonium, triethylbutylphosphonium, propyltributylphosphonium, dipropyldibutylphosphonium, tripropylbutylphosphonium, trimethyldecylphosphonium, trimethylphenylphosphonium, triethylphenylphosphonium, tripropylphenylphosphonium, tributylphenylphosphonium, methyltriphenylphosphonium, ethyltriphenylphosphonium, propyltriphenylphosphonium, butyltriphenylphosphonium, tetraphenylphosphonium, trimethylbenzylphosphonium, etc.

Also, examples of the quaternary phosphonium ion shown by the general formula (I) described above wherein the adjoining alkyl groups combine with each other to form a ring are alicyclic phosphonium ions represented by the following general formula (II) or (III):

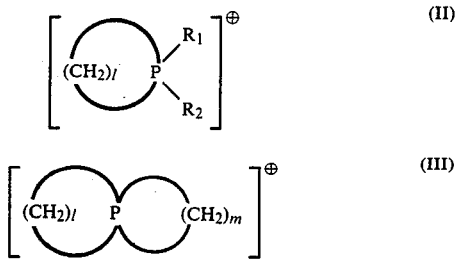

wherein, $R_1$ and $R_2$ each represents an alkyl group or an aryl group as defined above about the general formula (I) and l and m each represents an integer of from 4 to 6.

Examples of the alicyclic phosphonium ions shown by the general formula (II) or (III) described above are 1,1-dimethylphosphoranium, 1-methyl-1-ethylphosphoranium, 1,1-diethylphosphoranium, 1,1-dimethylphosphorinanium, 1-methyl-1-ethylphosphorinanium, 1,1-diethylphosphorinanium, 1,1-pentamethylenephosphorinanium, etc.

Furthermore, polycations shown by the general formula (IV) described below can be also effectively used as the quaternary phosphonium ions:

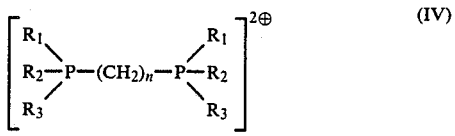

wherein, $R_1$, $R_2$, and $R_3$ each represents an alkyl group or an aryl group as defined above about the general formula (I) described above and n represents an integer of from 1 to 20.

In the case of obtaining the electrolyte having higher electric conductivity, the quaternary phosphonium ion having a low molecular weight (e.g., having up to 10 carbon atoms in the total alkyl and/or aryl groups), such as, for example, a tetraethylphosphonium ion and a methyltriethylphosphonium ion is preferred, while in the case of obtaining the electrolyte having high scintillation voltage, the quaternary phosphonium ion having a high molecular weight, such as, for example, a tetrabutylphosphonium ion, a tetrahexylphosphonium ion, etc., is preferred.

The anion component of the solute for use in this invention is a conjugate base of an organic or inorganic acid and examples of the acid are:

(1) organic carboxylic acids and organic weak acids such as phenols having pKa of at least 1, etc.;

(2) organic strong acids such as picric acid, sulfonic acid, etc.;

(3) inorganic weak acids having pKa of at least 1, such as boric acid, phosphoric acid, phosphorous acid, hypophosphorous acid, carbonic acid, silicic acid, etc., and the alkyl or aryl derivatives thereof;

(4) inorganic strong acids such as nitric acid, sulfuric acid, sulfurous acid, thiocyanic acid, etc., and the derivatives thereof; and (5) very strong acids having pKa of up to 0 (i.e., 0 or a negative value) containing halogen atom.

The anions selected from the organic or inorganic weak acids are preferred since they are excellent in the anodic oxidation film-forming faculty on aluminum and, in particular, dicarboxylic acids having the total carbon atom number of at least 10 and boric acid are good "film-forming anions", having high scintillation voltage, and hence can be used for medium to high voltage capacitors.

The anions of the strong acids apt to corrode the oxidation film because of their high acidity and hence are used for capacitors for low voltage of up to 100 volts.

Also, the anions of the acids containing halogen atom liberate a halogen ion unpreferably for aluminum and hence are used for capacitors for low voltage of up to 10 volts only.

Now, the carboxylic acids for the quaternary phosphonium salts of carboxylic acids, which are used in this invention, are aliphatic and aromatic monovalent or polyvalent carboxylic acids having 1 to 30 total carbon atoms.

Specific examples of these carboxylic acids are aliphatic monocarboxylic acids such as formic acid, acetic acid, propionic acid, butyric acid, valeric acid, caproic acid, enanthic acid, caprylic acid, pelargonic acid, capric acid, undecylic acid, lauric acid, tridecylic acid, myristic acid, pentadecylic acid, palmitic acid, heptadecylic acid, stearic acid, nonadecylic acid, arachidinic acid, isobutyric acid, isovaleric acid, isocaproic acid, ethylbutyric acid, methylvaleric acid, isocaprylic acid, propylvaleric acid, ethylcaproic acid, isocaprylic acid, tuberculostearic acid, pivalic acid, 2,2-dimethylbutanoic acid, 2,2-dimethylpentanoic acid, 2,2-dimethylhexanoic acid, 2,2-dimethylheptanoic acid, 2,2-dimethyloctanoic acid, 2-methyl-2-ethylbutanoic acid, 2-methyl-2-ethylpentanoic acid, 2-methyl-2-ethylhexanoic acid, 2-methyl-2-ethyl-heptanoic acid, 2-methyl-2-propylpentanoic acid, 2-methyl-2-propylhexanoic acid, 2-methyl-2-propylheptanoic acid, acrylic acid, crotonic acid, isocrotonic acid, 3-butenoic acid, pentenoic acid, hexenoic acid, heptenoic acid, octenoic acid, nonenoic acid, decenoic acid, undecenoic acid, dodecenoic acid, tudzuic acid, physeteric acid, goshuyuic acid, palmitoleic acid, petroselinic acid, oleic acid, elaidic acid, vaccenic acid, gadoleic acid, methacrylic acid, 3-methylcrotonic acid, tiglic acid, methylpentenoic acid, cyclopentanecarboxylic acid, cyclohexanecarboxylic acid, etc.; aliphatic dicarboxylic acids such as oxalic acid, malonic acid, succinic acid, glutaric acid, adipic acid, pimelic acid, suberic acid, azelaic acid, sebacic acid, undecanedioic acid, dodecanedioic acid, tridecanedioic acid, tetradecanedioic acid, pentadecanedioic acid, hexadecanedioic acid, heptadecanedioic acid, octadecanedioic acid, nonadecanedioic acid, eicosanedioic acid, methylmalonic acid, ethylmalonic acid, propylmalonic acid, butylmalonic acid, pentylmalonic acid, hexylmalonic acid, dimethylmalonic acid, methylethylmalonic acid, diethylmalonic acid, methylpropylmalonic acid, methylbutylmalonic acid, ethylpropylmalonic acid, dipropylmalonic acid, ethylbutylmalonic acid, propylbutylmalonic acid, dibutylmalonic acid, methylsuccinic acid, ethylsuccinic acid, 2,2-dimethylsuccinic acid, 2,3-dimethylsuccinic acid, 2-methylglutaric acid, 3-methylglutaric acid, 3-methyl-3-ethylglutaric acid, 3,3-diethylglutaric acid, maleic acid, citraconic acid, 1,15-octanedicarboxylic acid, 5,6-decanedicarboxylic acid, 1,7-decanedicarboxylic acid, 4,6-dimethyl-4-nonene-1,2-dicarboxylic acid, 4,6-dimethyl-1,2-nonanedicarboxylic acid, 1,7-dodecanedicarboxylic acid, 5-ethyl-1,10-decanedicarboxylic acid, 6-methyl-6-dodecene- 1,12-dicarboxylic acid, 6-methyl-1,12-dodecanedicarboxylic acid, 6-ethylene-1,12-dodecanedicarboxylic acid, 6-ethyl-1,12-dodecanedicarboxylic acid, 7-methyl-7-tetradecene-1,14-dicarboxylic acid, 7-methyl-1,14-tetradecanedicarboxylic acid, 3-hexyl-4-decene-1,2-dicarboxylic acid, 3-hexyl-1,2-decanedicarboxylic acid, 6-ethylene-9-hexadecene-1,16-dicarboxylic acid, 6-ethyl-1,16-hexadecanedicarboxylic acid, 6-phenyl-1,12-dodecanedicarboxylic acid, 7,12-dimethyl-7,11-octadecadiene-1,18-dicarboxylic acid, 7,12-dimethyl-1,18-octadecanedicarboxylic acid, 6,8-diphenyl-1,14-tetradecanedicarboxylic acid, 1,1-cyclopentanedicarboxylic acid, 1,2-cyclopentanedicarboxylic acid, 1,1-cyclohexanedicarboxylic acid, 1,2-cyclohexanedicarboxylic acid, 4-cyclohexene-1,2-dicarboxylic acid, 5-norbornene-2,3-dicarboxylic acid, etc.; aromatic monocarboxylic acids (including o, m, p-isomers thereof) such as benzoic acid, toluic acid, ethylbenzoic acid, propylbenzoic acid, isopropylbenzoic acid, butylbenzoic acid, isobutylbenzoic acid, sec-butylbenzoic acid, tert-butylbenzoic acid, hydroxybenzoic acid, anisic acid, ethoxybenzoic acid, propoxybenzoic acid, isopropoxybenzoic acid, butoxybenzoic acid, isobutoxybenzoic acid, sec-butoxybenzoic acid, tert-butoxybenzoic acid, aminobenzoic acid, N-methylaminobenzoic acid, N-ethylaminobenzoic acid, N-propylaminobenzoic acid, N-isopropylaminobenzoic acid, N-butylaminobenzoic acid, N-isobutylaminobenzoic acid, N-sec-butylaminobenzoic acid, N-tert-butylaminobenzoic acid, N,N-dimethylaminobenzoic acid, N,N-diethylaminobenzoic acid, nitrobenzoic acid, resorcylic acid, etc.; and aromatic polyvalent carboxylic acids such as phthalic acid, isophthalic acid, terephthalic acid, 3-nitrophthalic acid, 4-nitrophthalic acid, trimellitic acid, hemimellitic acid, trimesic acid, pyromellitic acid, etc.

Also, specific examples of phenols in the quaternary phosphonium salts of phenols for use in this invention are phenol, catechol, resorcinol, hydroquinone, phloroglucinol, pyrogallol, 1,2,4-trihydroxybenzene, o-nitrophenol, m-nitrophenol, p-nitrophenol, 2,4-dinitrophenol, 2,5-dinitrophenol, 2,6-dinitrophenol, 3,4-dinitrophenol, 4-nitrocatechol, 2-nitroresorcinol, etc.

Picric acid which is an organic strong acid is a strong acid having pKa of −0.2. Sulfonic acid which is also an organic strong acid is an aliphatic or aromatic monovalent or polyvalent sulfonic acid. The total carbon atom number of the sulfonic acid for use in this invention is in the range of from 1 to 30.

Specific examples of the sulfonic acid are methanesulfonic acid, ethanesulfonic acid, propanesulfonic acid, butanesulfonic acid, pentanesulfonic acid, hexanesulfonic acid, heptanesulfonic acid, octanesulfonic acid, nonanesulfonic acid, decanesulfonic acid, vinylsulfonic acid, allylsulfonic acid, 1,2-ethanedisulfonic acid, 1,4-butanedisulfonic acid, benzenesulfonic acid, p-toluenesulfonic acid, p-ethylbenzenesulfonic acid, xylenesulfonic acid, naphthalenesulfonic acid, phenolsolfonic acid, nitrobenzenesulfonic acid, 2,4-dinitrobenzenesulfonic acid, picrylsulfonic acid, pyridine-3-sulfonic acid, m-benzenedisulfonic acid, toluene-3,4-disulfonic acid, etc.

The inorganic weak acids and the derivatives thereof for use in this invention are, for example, boric acid, boric acid derivatives represented by the general formula (V) described below, phosphoric acid, phosphoric acid esters represented by the general formula (VI) described below, phosphorous acid, phosphorous acid derivatives represented by the general formula (VII), hypophosphorous acid, hypophosphorous acid derivatives represented by the general formula (VIII), carbonic acid, carbonic acid monoesters represented by the general formula (IX), silicic acid, etc.

(V)

(VI)

(VII)

(VIII)

(IX)

wherein, $R_5$, $R_6$, $R_7$ and $R_8$ each represents an alkyl group having from 1 to 10 carbon atoms or an aryl group and also $R_6$ or $R_7$ may be a hydrogen atom.

Specific examples of the boric acid derivatives shown by the general formula (V) described above are methane boric acid, ethane boric acid, phenyl boric acid, etc.

Specific examples of the phosphoric acid derivatives shown by the general formula (VI) described above are phosphoric acid monomethyl ester, phosphoric acid dimethyl ester, phosphoric acid monophenyl ester, etc.

Specific examples of the phosphorous acid derivatives shown by the general formula (VII) described above are phosphorous acid monomethyl ester, methylphosphonic acid, methylphosphonic acid methyl ester, etc.

Specific examples of the hypophosphorous acid derivatives shown by the general formula (VIII) described above are methylphosphonic acid, dimethylphosphinic acid, phenylphosphinic acid, etc.

Also, specific examples of the carbonic acid monoesters shown by the general formula (IX) described above are carbonic acid monomethyl ester, carbonic acid monophenyl ester, etc.

The inorganic strong acids and the derivatives thereof for use in this invention are, for example, nitric acid, sulfuric acid, sulfuric acid monoesters shown by the general formula (X) described below, sulfurous acid, sulfurous acid monoesters shown by the general formula (XI) described below, and thiocyanic acid.

(X)

(XI)

wherein, $R_9$ and $R_{10}$ each represents an alkyl group having from 1 to 10 carbon atoms or an aryl group.

Also, the acid containing halogen atom is an acid showing a very strong acidity owing to the halogen atom having high electronegativity contained therein. Specific examples of such an acid are $HBF_4$ (pKa= −5), $HPF_6$ (pKa= −20), $HAsF_6$, $HSbF_6$, $CF_3SO_3H$ (pKa= −13), $CF_3COOH$ (pKa=0), $C_4F_9SO_3H$, $C_4F_9CO_2H$, $HClO_4$ (pKa= −5), etc.

As the solvent for dissolving the quaternary phosphonium salts in this invention, there are amide solvents such as N-methylformamide, N-ethylformamide, N,N-dimethylformamide, N,N-diethylformamide, N-methylacetamide, N-ethylacetamide, N,N-dimethylacetamide, N,N-diethylacetamide, N-methylpyrrolidinone, N-methyloxazolidinone, N,N'-dimethylimidazolidinone, etc.; lactone solvents such as γ-butyrolactone, γ-valerolactone, ⊕-valerolactone, etc.; carbonate solvents such as ethylene carbonate, propylene carbonate, butylene carbonate, etc.; nitrile solvents such as 3-methoxypropionitrile, etc.; and phosphoric acid ester solvents such as trimethyl phosphate, etc. These solvents can be used singly or as a mixture thereof.

Among these, solvents composed mainly of aprotic solvents such as amides and lactones are preferred, and particularly solvents composed mainly of Δ-butyrolactone are preferred by the following reasons.

γ-butyrolactone has a broad freezing point-boiling point range and is less toxic. γ-butyrolactone also does not attack the sealing gaskets compared with amide solvents, and electrolytic capacitor using this solvent is hardly suffered serious damage from halogen ion generated from the washing agent for solder flux which will be transmitted through a closure.

The amount of the quaternary phosphonium salt to be dissolved in the aforesaid solvent depends upon the desired electric conductivity and scintillation voltage but is generally less than the saturated concentration, preferably from 0.1 to 40% by weight, and more preferably from 5 to 30% by weight for low voltage capacitors and from 1 to 20% by weight for medium to high voltage capacitors, based on the weight of the electrolyte.

The electrolyte of this invention is substantially composed of the quaternary phosphonium salt and the aprotic solvent but may further contain a small amount of an auxiliary solute for various purposes such as the prevention of electrolytic corrosion, the reduction of leakage current, etc.

Then, the invention will be explained in greater detail with reference to the following examples and comparison examples, but the present invention should not be construed as being limited thereto.

EXAMPLE 1

An electrolyte was obtained by dissolving monotetraethylphosphonium maleate in an amount of 20% by weight based on a weight of an electrolyte in γ-butyrolactone as the solvent. The electric conductivity of the electrolyte at 25° C. was 12.1 mS/cm and the scintillation voltage was 93 V when a constant electric current of 4 mA/cm² was applied to one set of plus and minus smooth aluminum foils in the electrolyte. In addition, the result of measuring the change of the electric conductivity of the electrolyte by the change of temperature is shown in the accompanying drawing.

EXAMPLE 2

An electrolyte was obtained by the same way as in Example 1 except for using monotetramethylphosphonium maleate in place of monotetraethylphosphonium maleate. The electric conductivity at 25° C. and the scintillation voltage of the electrolyte were 10.7 mS/cm and 88 V, respectively.

EXAMPLE 3

An electrolyte was obtained by the same way as in Example 1 except for using monotetrabutylphosphonium maleate in place of monotetraethylphosphonium maleate. The electric conductivity at 25° C. and scintillation voltage of the electrolyte were 6.6 mS/cm and 103 V, respectively.

COMPARISON EXAMPLE 1

An electrolyte was obtained by dissolving monotriethylammonium maleate in an amount of 20% by weight based on a weight of an electrolyte in γ-butyrolactone as the solvent. The electric conductivity of the electrolyte at 25° C. was 4.2 mS/cm.

EXAMPLES 4 TO 13

Electrolytes were obtained by the same way as in Example 1 except for using tetraethylphosphonium formate (Example 4), tetraethylphosphonium stearate (Example 5), monotetraethylphosphonium adipate (Example 6), monotetraethylphosphonium sebacate (Example 7), monotetraethylphosphonium eicosanedioate (Example 8), monotetraethylphosphonium dimethylmalonate (Example 9), monotetraethylphoshponium 6-ethyl-1,16-hexadecanedicarboxylate (Example 10), monotetraethylphosphonium cyclopentylmalonate (Example 11), tetraethylphosphonium benzoate (Example 12), and monotetraethylphosphonium phthalate (Example 13), respectively, in place of monotetraethylphosphonium maleate. The electric conductivities and scintillation voltages of these electrolytes are shown in Table 1 below.

EXAMPLES 14 TO 23

Electrolytes were obtained by the same ways as in Examples 1, 4, and 6 to 13 except for using N,N-dimethylformamide as a solvent in place of γ-butyrolactone. The electric conductivities and scintillation voltages of the electrolytes are shown in Table 2 below.

EXAMPLES 24 TO 34

Electrolytes were obtained by the same ways as in Examples 1 and 4 to 13 except for using propylene carbonate as a solvent in place of γ-butyrolactone. The electric conductivities and scintillation voltages of the electrolytes are shown in Table 3 below.

EXAMPLES 35 TO 43

Electrolytes were obtained by the same ways as in Examples 1, 4, 6, 7 and 9 to 13 except for using trimethyl phosphate as a solvent in place of γ-butyrolactone. The electric conductivities and scintillation voltages of the electrolytes are shown in Table 4 below.

In addition, the figures in the parentheses in the following tables are the highest voltages attained since spark was not generated.

Also, in the following tables, the following abbreviations were used.

GBL: γ-Butyrolactone

DMF: N,N-Dimethylformamide
PC: Propylene Carbonate
TMP: Trimethyl Phosphate

TABLE 1

| Example | Solvent | Solute (20 wt %) | E. C. (mS/cm) | S. V. (V) |
|---|---|---|---|---|
| 4 | GBL | Tetraethylphosphonium formate | 14.3 | (168) |
| 5 | " | Tetraethylphosphonium stearate | 4.0 | 200 |
| 6 | " | Monotetraethylphosphonium adipate | 5.1 | 131 |
| 7 | " | Monotetraethylphosphonium sebacate | 4.8 | 229 |
| 8 | " | Monotetraethylphosphonium eicosanedioate | 3.4 | 320 |
| 9 | " | Monotetraethylphosphonium dimethylmalonate | 10.9 | 164 |
| 10 | " | Monotetraethylphosphonium 6-ethyl-1,16-hexadecanedicarboxylate | 3.8 | 190 |
| 11 | " | Monotetraethylphosphonium cyclopentylmalonate | 8.0 | 117 |
| 12 | " | Tetraethylphosphonium benzoate | 8.1 | 111 |
| 13 | " | Monotetraethylphosphonium phthalate | 9.4 | 100 |

E. C.: Electric Conductivity at 25° C.
S. V.: Scintillation Voltage (4 mA/cm$^2$)

TABLE 2

| Example | Solvent | Solute (20 wt %) | E. C. (mS/cm) | S. V. (V) |
|---|---|---|---|---|
| 14 | DMF | Monotetraethylphosphonium maleate | 18.8 | 65 |
| 15 | " | Tetraethylphosphonium formate | 17.8 | (29) |
| 16 | " | Monotetraethylphosphonium adipate | 7.6 | 97 |
| 17 | " | Monotetraethylphosphonium sebacate | 7.1 | 206 |
| 18 | " | Monotetraethylphosphonium eicosanedioate | 5.0 | 290 |
| 19 | " | Monotetraethylphosphonium dimethylmalonate | 15.2 | (30) |
| 20 | " | Monotetraethylphosphonium 6-ethyl-1,16-hexadecanedicarboxylate | 5.2 | 195 |
| 21 | " | Monotetraethylphosphonium cyclopentylmalonate | 11.6 | (31) |
| 22 | " | Tetraethylphosphonium benzoate | 10.7 | (26) |
| 23 | " | Monotetraethylphosphonium phthalate | 14.2 | 71 |

E. C. and S. V.: Same as in Table 1.

TABLE 3

| Example | Solvent | Solute (20 wt %) | E. C. (mS/cm) | S. V. (V) |
|---|---|---|---|---|
| 24 | PC | Monotetraethylphosphonium maleate | 10.0 | 91 |
| 25 | " | Tetraethylphosphonium formate | 14.1 | (69) |
| 26 | " | tetraethylphosphonium stearate | 6.2 | 224 |
| 27 | " | Monotetraethylphosphonium adipate | 4.6 | 143 |
| 28 | " | Monotetraethylphosphonium sebacate | 4.0 | 183 |
| 29 | " | Monotetraethylphosphonium eicosanedioate | 2.9 | 253 |
| 30 | " | Monotetraethylphosphonium dimethylmalonate | 8.3 | (124) |
| 31 | " | Monotetraethylphosphonium 6-ethyl-1,16-hexadecanedicarboxylate | 3.2 | 230 |
| 32 | " | Monotetraethylphosphonium cyclopentylmalonate | 6.6 | 130 |
| 33 | " | Tetraethylphosphonium benzoate | 7.1 | 116 |
| 34 | " | Monotetraethylphosphonium phthalate | 7.3 | 100 |

E. C. and S. V.: Same as in Table 1.

TABLE 4

| Example | Solvent | Solute (20 wt %) | E. C. (mS/cm) | S. V. (V) |
|---|---|---|---|---|
| 35 | TMP | Monotetraethylphosphonium maleate | 7.9 | 164 |
| 36 | " | Tetraethylphosphonium formate | 7.6 | (84) |
| 37 | " | Monotetraethylphosphonium adipate | 3.5 | 110 |
| 38 | " | Monotetraethylphosphonium sebacate | 3.0 | 184 |
| 39 | " | Monotetraethylphosphonium dimethylmalonate | 6.4 | 190 |
| 40 | " | Monotetraethylphosphonium 6-ethyl-1,16-hexadecanedicarboxylate | 2.3 | 220 |
| 41 | " | Monotetraethylphosphonium cyclopentylmalonate | 5.1 | 230 |
| 42 | " | Tetraethylphosphonium benzoate | 4.1 | 159 |
| 43 | " | Monotetraethylphosphonium phthalate | 6.0 | 133 |

E. C. and S. V.: Same as in Table 1.

EXAMPLE 44

An electrolyte was obtained by dissolving tetrabutylphosphonium phenolate in an amount of 20% by weight based on a weight of an electrolyte in γ-butyrolactone as the solvent. The electric conductivity of the electrolyte at 25° C. was 5.0 mS/cm and the scintillation voltage of the electrolyte was 105 V when a constant electric current of 4 mA/cm$^2$ was applied to one set of plus and minus smooth aluminum foils in the electrolyte.

COMPARISON EXAMPLE 2

An electrolyte was obtained by dissolving triethylammonium phenolate in an amount of 20% by weight based on a weight of an electrolyte in γ-butyrolactone as the solvent. The electric conductivity of the electrolyte at 25° C. was 0.4 mS/cm.

EXAMPLE 45

An electrolyte was obtained by dissolving tetrabutylphosphonium methanesulfonate in an amount of 20% by weight based on a weight of an electrolyte in γ-butyrolactone as the solvent. The electric conductivity of the electrolyte at 25° C. was 5.8 mS/cm and the highest voltage attained was 17 V.

COMPARISON EXAMPLE 3

An electrolyte was obtained by dissolving triethylammonium methanesulfonate in an amount of 20% by weight based on a weight of an electrolyte in γ-butyrolactone as the solvent. The electric conductivity of the electrolyte at 25° C. was 3.1 mS/cm.

EXAMPLE 46

An electrolyte was obtained by dissolving a tetraethylphosphonium salt of boric acid in an amount of 20% by weight based on a weight of an electrolyte in γ- butyrolactone as the solvent. The electric conductivity of the electrolyte at 25° C. was 2.8 mS/cm and the scintillation voltage was 420 V when a constant electric current of 4 mA/cm² was applied to one set of plus and minus smooth aluminum foils in the electrolyte.

EXAMPLE 47

An electrolyte was obtained by the same way as in Example 46 except for using a tetrabutylphosphonium salt of boric acid in place of the tetraethylphosphonium salt of boric acid. The electric conductivity at 25° C. and the scintillation voltage of the electrolyte were 0.9 mS/cm and 520 V, respectively.

COMPARISON EXAMPLE 4

When the conventional ammonium borate was added in an amount of 10% by weight based on a weight of an electrolyte of γ-butyrolactone as the solvent and the mixture was heated, the ammonium salt was not dissolved and hence the mixture was unsuitable for electrolyte.

EXAMPLE 48

An electrolyte was obtained by the same way as in Example 46 except for using a tetraethylphosphonium salt of metaneboric acid in place of the tetraethylphosphonium borate. The electric conductivity at 25° C. and the scintillation voltage of the electrolyte were 4.6 mS/cm and 210 V, respectively.

EXAMPLE 49

An electrolyte was obtained by dissolving tetrabutylphosphonium salt of phosphoric acid in an amount of 20% by weight based on a weight of an electrolyte in γ-butyrolactone as the solvent. The electric conductivity of the electrolyte at 25° C. was 6.5 mS/cm.

EXAMPLE 50

An electrolyte was prepared by the same way as in Example 49 except for using N,N-dimethylformamide as the solvent in place of γ-butyrolactone. The electric conductivity of the electrolyte at 25° C. was 7.6 mS/cm.

EXAMPLE 51

An electrolyte was prepared by the same way as in Example 49 except for using propylene carbonate as the solvent in place of γ-butyrolactone. The electric conductivity of the electrolyte at 25° C. was 6.5 mS/cm.

EXAMPLE 52

An electrolyte was obtained by dissolving tetraethylphosphonium salt of phosphorous acid in an amount of 20% by weight based on a weight of an electrolyte in γ-butyrolactone as the solvent. The electric conductivity of the electrolyte at 25° C. was 8.2 mS/cm and the highest voltage attained was 170 V when a constant electric current of 5 mA/cm² was applied to one set of plus and minus smooth aluminum foils in the electrolyte.

EXAMPLE 53

An electrolyte was obtained by dissolving tetraethylphosphonium salt of carbonic acid in an amount of 20% by weight based on a weight of an electrolyte in γ-butyrolactone as the solvent. The electric conductivity of the electrolyte at 25° C. was 8.3 mS/cm and the scintillation voltage thereof was 208 V when a constant electric current of 4 mA/cm² was applied to one set of plus and minus smooth aluminum foils in the electrolyte.

EXAMPLE 54

An electrolyte was prepared by the same way as in Example 53 except for using N,N-dimethylformamide as the solvent in place of γ-butyrolactone.

EXAMPLE 55

An electrolyte was prepared by the same way as in Example 53 except for using a tetrabutylphosphonium salt of carbonic acid in place of the tetraethylphosphonium salt of carbonic acid.

EXAMPLE 56

An electrolyte was prepared by the same way as in Example 55 except for using propylene carbonate as the solvent in place of γ-butyrolactone.

The electric conductivities and scintillation voltages of these electrolytes are shown in Table 5 below.

TABLE 5

| Example | Solvent | Solute (20 wt %) | E. C. (mS/cm) | S. V. (V) |
|---|---|---|---|---|
| 53 | GBL | Tetraethylphosphonium salt of carbonic acid | 8.3 | 208 |
| 54 | DMF | Tetraethylphosphonium salt of carbonic acid | 9.4 | 210 |
| 55 | GBL | Tetrabutylphosphonium salt of carbonic acid | 5.4 | 220 |
| 56 | PC | Tetrabutylphosphonium salt of carbonic acid | 5.8 | 220 |

E. C.: Electric conductivity at 25° C.
S. V.: Scintillation voltage

EXAMPLE 57

An electrolyte was obtained by dissolving methyltributylphosphonium methyl carbonate in an amount of 20% by weight based on a weight of an electrolyte in γ-butyrolactone as the solvent. The electric conductivity of the electrolyte at 25° C. was 3.6 mS/cm and the scintillation voltage of the electrolyte was 180 V when a constant electric current of 5 mA/cm² was applied to one set of plus and minus smooth aluminum foils in the electrolyte.

EXAMPLE 58

An electrolyte was obtained by dissolving a tetrabutylphosphonium salt of silicic acid in an amount of 20% by weight based on a weight of an electrolyte in γ-butyrolactone as the solvent. The electric conductivity of the electrolyte at 25° C. was 4.5 mS/cm and the scintillation voltage of the electrolyte was 410 V when a constant electric current of 4 mA/cm² was applied to one set of plus and minus smooth aluminum foils in the electrolyte.

EXAMPLE 59

An electrolyte was obtained by the same way as in Example 58 except for using N,N-dimethylformamide as the solvent in place of γ-butyrolactone. The electric conductivity at 25° C. and the scintillation voltage of the electrolyte were 6.1 mS/cm and 500 V, respectively.

EXAMPLE 60

An electrolyte was obtained by the same way as in Example 58 except for using propylene carbonate as the solvent in place of γ-butyrolactone. The electric conductivity at 25° C. and the scintillation voltage of the electrolyte were 4.7 mS/cm and 500 V, respectively.

EXAMPLE 61

An electrolyte was obtained by dissolving tetraethylphosphonium nitrate in an amount of 20% by weight based on a weight of an electrolyte in γ-butyrolactone as the solvent. The electric conductivity of the electrolyte at 25° C. was 15.3 mS/cm.

EXAMPLE 62

An electrolyte was prepared by the same way as in Example 61 except for using N,N-dimethylformamide as the solvent in place of γ-butyrolactone. The electric conductivity of the electrolyte at 25° C. was 20.6 mS/cm.

EXAMPLE 63

An electrolyte was obtained by the same way as in Example 61 except for using monotetraethylphosphonium salt of sulfurous acid in place of tetraethylphosphonium nitrate. The electric conductivity at 25° C. and the highest voltage attained of the electrolyte were 11.7 mS/cm and 100 V, respectively.

EXAMPLE 64

An electrolyte was obtained by dissolving a tetraethylphosphonium thiocyanate in an amount of 20% by weight based on a weight of an electrolyte in γ-butyrolactone as the solvent. The electric conductivity of the electrolyte at 25° C. was 15.8 mS/cm.

EXAMPLE 65

An electrolyte was prepared by the same way as in Example 64 except for using N,N-dimethylformamide as the solvent in place of γ-butyrolactone. The electric conductivity of the electrolyte at 25° C. was 21.0 mS/cm.

EXAMPLE 66

An electrolyte was obtained by dissolving tetraethylphosphonium tetrafluoroborate in an amount of 20% by weight based on a weight of an electrolyte in γ-butyrolactone as the solvent. The electric conductivity of the electrolyte at 25° C. was 17.7 mS/cm. Also, by immersing one set of plus and minus smooth aluminum foils in the electrolyte and applying thereto a constant electric current of 4 mA/cm$^2$, an oxide film was formed on the aluminum anode. The highest voltage attained in this case was 85 V.

EXAMPLES 67 AND 68

Electrolytes were prepared by the same way as in Example 66 except for using tetramethylphosphonium tetrafluoroborate (Example 67) and tetrabutylphosphonium tetrafluoroborate (Example 68) in place of tetraethylphosphonium tetrafluoroborate. The electric conductivities of the electrolytes are shown in Table 6 below.

EXAMPLES 69 AND 70

Electrolytes were prepared by the same way as in Example 66 except for using N,N-dimethylformamide (Example 69) and propylene carbonate (Example 70) as the solvent in place of γ-butyrolactone. The electric conductivities of the electrolytes obtained are shown in Table 6 below.

TABLE 6

| Example | Solvent | Solute (20 wt %) | Electric Conductivity (mS/cm) (25° C.) |
|---|---|---|---|
| 66 | GBL | Et$_4$PBF$_4$ | 17.7 |
| 67 | " | Me$_4$PBF$_4$ | 10.4 |
| 68 | " | Bu$_4$PBF$_4$ | 9.4 |
| 69 | DMF | Et$_4$PBF$_4$ | 25.4 |
| 70 | PC | Et$_4$PBF$_4$ | 14.1 |

EXAMPLE 71

An electrolyte was obtained by dissolving tetraethylphosphonium hexafluoroantimonate in an amount of 20% by weight based on a weight of an electrolyte in γ-butyrolactone as the solvent. The electric conductivity of the electrolyte at 25° C. was 12.0 mS/cm. Also, by immersing one set of plus and minus smooth aluminum foils in the electrolyte and applying a constant electric current of 4 mA/cm$^2$ to the aluminum foils, an oxide film was formed on the aluminum anode. The highest voltage attained in this case was 270 V.

EXAMPLES 72 TO 74

Electrolytes were prepared by the same way as in Example 71 except for using tetraethylphosphonium hexafluorophosphate (Example 72), tetraethylphosphonium perchlorate (Example 73), and tetraethylphosphonium trifluoromethanesulfonate (Example 74) in place of tetraethylphosphonium hexafluoroantimonate. The electric conductivities of the electrolytes are shown in Table 7 below.

EXAMPLES 75 AND 76

Electrolytes were prepared in the same way as in Example 74 except for using N,N-dimethylformamide (Example 75) and propylene carbonate (Example 76) as the solvent in place of γ-butyrolactone, the electric conductivities of the electrolytes are shown in Table 7 below.

TABLE 7

| Example | Solvent | Solute (20 wt %) | Electric Conductivity (mS/cm) (25° C.) |
|---|---|---|---|
| 71 | GBL | Et$_4$PSbF$_6$ | 12.0 |
| 72 | " | Et$_4$PPF$_6$ | 14.8 |
| 73 | " | Et$_4$PClO$_4$ | 15.2 |
| 74 | " | Et$_4$PSO$_3$CF$_3$ | 12.9 |
| 75 | DMF | Et$_4$PSO$_3$CF$_3$ | 18.7 |
| 76 | PC | Et$_4$PSO$_3$CF$_3$ | 10.7 |

While the invention has been described in detail and with reference to specific embodiments thereof, it will be apparent to one skilled in the art that various changes and modifications can be made therein without departing from the spirit and scope thereof.

What is claimed is:

1. An electrolyte for an aluminum electrolytic capacitor, comprising a solution of from 0.1 to 40% by weight based on the weight of the electrolyte of a quaternary phosphonium salt dissolved in an aprotic solvent selected from the group consisting of amide, lactone, carbonate, nitrile and phosphoric acid ester solvents, wherein the anion component of said quaternary phosphonium salt is a conjugate base of an organic or inorganic acid and wherein the quaternary phosphonium cation of said quaternary phosphonium salt has the formula (I):

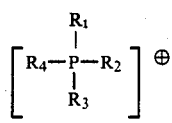 (I)

wherein, $R_1$, $R_2$, $R_3$ and $R_4$ each represent an alkyl group having from 1 to 10 carbon atoms, and wherein two of said alkyl groups that are adjacent to each other are combinable to form a alicyclic ring.

2. The electrolyte as claimed in claim 1, wherein the aprotic solvent is γ-butyrolactone.

3. The electrolyte as claimed in claim 1, wherein the anion component of said quaternary phosphonium salt is a conjugate base of an acid selected from the group consisting of an organic weak acid having a pKa of at least 1.0 and an inorganic weak acid having pKa of at least 1.0.

* * * * *